United States Patent Office 3,518,075
Patented June 30, 1970

3,518,075
METHOD OF CONTROLLING WEEDS
Mervin E. Brokke, Richmond, Calif., and Chester L. Dewald, Houston, Tex., assignors to Stauffer Chemical Company, New York, N.Y., a corporation of Delaware
No Drawing. Filed Jan. 28, 1963, Ser. No. 254,418
Int. Cl. A01n 9/14
U.S. Cl. 71—103     6 Claims

ABSTRACT OF THE DISCLOSURE

This invention relates to the use as herbicides of certain compounds represented by the formula:

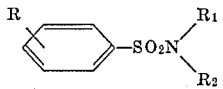

This invention relates to the use of certain compositions of matter as herbicides. More specifically, the present invention regards the use of compounds of the general formulae:

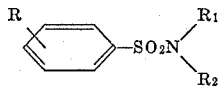

wherein R is hydrogen, lower alkyl, lower alkoxy, halogen or nitro substituent and $R_1$ is selected from the group consisting of hydrogen, lower alkyl and lower alkenyl, and $R_2$ is lower alkyl or lower alkenyl. By lower alkyl, lower alkoxy, and lower alkenyl is meant a radical containing from one to five carbon atoms.

The compounds of the present invention and the method of preparing are old and well known in the art and thus only their use as a herbicide is held to be novel.

One method of preparing the compounds of the present invention is to mix an appropriately substituted benzene sulfonyl chloride with ammonia, an appropriately substituted primary amine, or an appropriately substituted secondary amine in the presence of pyridine. A water solution of base, such as sodium hydroxide or the like, may be substituted for the solvent pyridine as this also readily picks up the liberated HCl from the reaction and leaves the desired compound.

The closest prior art known to applicants is German Pat. 1,091,419 which discloses the usefulness of some of the compounds of the present invention on potatoes while in storage so as to prevent them from sprouting.

The compounds of the present invention have been extensively tested both as pre-emergence herbicides and post-emergence herbicides with positive results on a wide variety of weed species. Pre-emergence herbicides are applied to a potential weed habitat either before or after seeding but before the crop emerges. If the herbicide is harmless to the desired crop, seeds or seedlings, but phytotoxic to weed seeds or seedlings encountered, the crop grows in a weed-free environment. Post-emergence herbicides are applied after the crop and/or weeds emerge from the soil and likewise must be harmless to the desired crop and phytotoxic with respect to the weeds encountered.

The phytotoxic compositions of the present invention may be applied to the weed habitat in any of the convenient forms well known to those skilled in the art. For instance, it can be dissolved in a solvent, such as acetone, or emulsified and sprayed onto the weed habitat; or it can be combined with a dry inert carrier and applied as a dust or as granules. The rates of application may vary widely depending on the results desired.

The phytotoxicity of the compounds of the present invention is shown by the results of the following test.

EXAMPLE

Seeds of hairy crabgrass are planted in rows one-half inch deep in Santa Cruz sandy loam soil contained in compressed paper flats 8¼" x 6½" which are 2¾" deep. The flats are watered after planting and the following day each flat is sprayed at rate of 20 pounds of the compound under test in 80 gallons of solution per acre. A No. 152 De Vilbiss atomizer is used to spray the solution on the soil surface. Two weeks later the degree of weed control is determined by comparing the amount of germination and growth of each weed in the treated flats with the weeds in several untreated control flats.

The following chart shows the results of the test described supra.

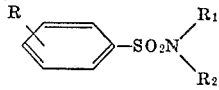

| Cpd. No. | R | $R_1$ | $R_2$ | Percent crabgrass control at 20 lbs./acre |
|---|---|---|---|---|
| 1 | Hydrogen | Hydrogen | Ethyl | XXX |
| 2 | do | do | i-Propyl | XXX |
| 3 | do | Methyl | Methyl | XXX |
| 4 | do | Allyl | Allyl | XXX |
| 5 | do | Propyl | Propyl | XXX |
| 6 | 2,5-dimethyl | Hydrogen | Ethyl | XXX |
| 7 | do | do | i-Propyl | XXX |
| 8 | do | Propyl | Propyl | XXX |
| 9 | 2,5-dimethyl | Allyl | Allyl | XXX |
| 10 | do | Methyl | Methyl | XXX |
| 11 | 4-methyl | Hydrogen | i-Butyl | XXX |
| 12 | do | do | n-Butyl | XXX |
| 13 | do | do | n-Propyl | XXX |
| 14 | 4-methoxy | do | i-Propyl | XXX |
| 15 | do | Ethyl | Allyl | XXX |
| 16 | 4-bromo | Hydrogen | Ethyl | XXX |
| 17 | do | do | i-Butyl | XXX |
| 18 | do | do | i-Propyl | XXX |
| 19 | do | do | n-Butyl | XXX |
| 20 | do | do | Propyl | XXX |
| 21 | do | Allyl | Allyl | XXX |
| 22 | do | Methyl | Methyl | XXX |
| 23 | 4-nitro | Hydrogen | i-Propyl | XXX |
| 24 | do | do | Ethyl | XXX |
| 25 | 3-nitro | do | do | XXX |
| 26 | do | do | i-Propyl | XXX |
| 27 | do | Methyl | Methyl | XXX |
| 28 | do | Allyl | Allyl | XXX |
| 29 | 4-chloro | Hydrogen | Hydrogen | X |
| 30 | do | Methyl | Methyl | XXX |
| 31 | do | Allyl | Allyl | XXX |
| 32 | do | Propyl | Propyl | XXX |
| 33 | do | Hydrogen | Ethyl | XXX |
| 34 | do | do | Propyl | XXX |
| 35 | do | do | i-Propyl | XXX |
| 36 | do | do | n-Butyl | XXX |
| 37 | do | do | i-Butyl | XXX |

XXX indicates complete control. XX indicates good control. X indicates partial control.

We claim:
1. The method of controlling weeds comprising: applying to a weed habitat a phytotoxic amount of a compound of the formulae:

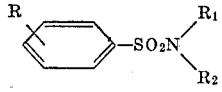

wherein R is selected from the group consisting of lower alkoxy and halogen; $R_1$ is selected from the group consisting of hydrogen, lower alkyl and lower alkenyl and $R_2$ is selected from the group consisting of lower alkyl and lower alkenyl radicals.

2. The method of claim 1 in which R is 4-bromo, $R_1$ is hydrogen, and $R_2$ is ethyl.

3. The method of claim 1 in which R is 4-bromo, $R_1$ and $R_2$ are allyl.

4. The method of claim 1 in which R is 4-bromo, $R_1$ and $R_2$ are methyl.

5. The method of claim 1 in which R is 4-chloro, $R_1$ is hydrogen, and $R_2$ is ethyl.

6. The method of claim 1 in which R is 4-chloro, $R_1$ is hydrogen, and $R_2$ is n-butyl.

References Cited

German application 1,091,419 published Oct. 20, 1960.
Gundel, German Pat. 823,970, Dec. 6, 1951.

JAMES O. THOMAS, Jr., Primary Examiner